United States Patent [19]

DeBoer et al.

[11] Patent Number: 4,908,631

[45] Date of Patent: Mar. 13, 1990

[54] ULTRASONIC PIXEL PRINTER

[75] Inventors: Charles DeBoer, Rochester; Michael Long, Fairport, both of N.Y.

[73] Assignee: Eastman Kodak Company, Rochester, N.Y.

[21] Appl. No.: 222,650

[22] Filed: Jul. 21, 1988

[51] Int. Cl.[4] .............................................. G01D 15/00

[52] U.S. Cl. ...................................... 346/76 R; 430/3; 156/73.1

[58] Field of Search ...................... 346/1.1, 76 R, 140, 346/139 R, 76 PH; 430/3; 156/73.1

[56] References Cited

U.S. PATENT DOCUMENTS

| | | | |
|---|---|---|---|
| 3,907,089 | 9/1975 | Montoya | 346/1.1 X |
| 4,046,073 | 9/1977 | Mitchell | 346/1.1 X |
| 4,086,112 | 4/1978 | Porter | 156/73.1 |
| 4,751,529 | 6/1988 | Elrod | 346/140 |
| 4,796,036 | 1/1989 | Misono | 346/108 |

OTHER PUBLICATIONS

Sakurai et al., Investigations on an Ultrasonic Piezoelectric Printer, Japanese Applied Physics, vol. 26, 1987, pp. 141–143.

Quate, The Acoustic Microscope: A Concept for Microscopy Using Waves of Sound, NR Review (1980/1981).

*Primary Examiner*—Joseph W. Hartary

*Attorney, Agent, or Firm*—Raymond L. Owens

[57] ABSTRACT

An ultrasonic pixel printer is disclosed in which ultrasonic energy is applied to a dye receiver layer to cause the dye to melt and/or sublime and transfer to a receiver.

3 Claims, 1 Drawing Sheet

ULTRASONIC PIXEL PRINTER

BACKGROUND OF THE INVENTION

1. Field of the Invention

The present invention relates to printers which use ultrasonic energy to transfer dye from a dye carrier to a receiver.

2. Description of the Prior Art

Some thermal printer apparatus use a dye transfer process. In this process, a carrier containing a dye is disposed between a receiver, such as paper, and a print head formed of for example a plurality of individual thermal heat producing elements often referred to as heating elements. The receiver and carrier are generally moved relative to the print head which is fixed. When a particular heating element is energized, it is heated and causes dye to transfer (e.g. by diffusion) from the carrier to an image pixel in the receiver. The density, or darkness, of the printed dye is a function of the temperature of the heating element and the time the carrier is heated. In other words, the heat delivered from the heating element to the carrier causes dye to transfer to an image pixel of a receiver. The amount of dye is directly related to the amount of heat transferred to the carrier.

Thermal dye transfer printer apparatus offer the advantage of true "continuous tone" dye density transfer. By varying the heat applied by each heating element to the carrier, a variable dye density image pixel is formed in the receiver. A problem with this type of arrangement is that the printing rate is limited due to the "cool down" time for each heating element. A second problem is that the area of the heating element generally produces large image pixels which is a limiting factor in providing high image resolution. A third problem is that substantial power is required to produce images, because not only the dye is heated, but also the support and heating element itself. A still further problem is caused by the fact that the dye carrier must be made rather thin to reduce the amount of heat needed and to provide image sharpness. Thin webs are hard to handle and difficult to manufacture.

In the proceedings of 7th Symposium on Ultrasonic Electronics, Kyoto 1986 Japanese Journal of Applied Physics, Vol. 26 (1987) Supplement 26-1, pp. 141–143, Sakurai et al discuss an ultrasonic piezoelectric apparatus where a printing wire is mechanically vibrated at 146 KH to heat and transfer a thermoplastic ink. The resolution of this system is limited to the mechanical dimensions of the printing wire.

SUMMARY OF THE INVENTION

It is an object of this invention to provide an improved printing system which uses wax transfer or sublimable dyes and provides high resolution images at reduced power.

It is another object of this invention to provide an improved printing system in which the printing rate is not limited due to "cool down" time of a print head, between printing lines of pixels.

It is another object of this invention to provide improved printing resolution which is constrained only by the focal diameter of sound in the appropriate selectable materials and results in much higher resolution than currently available when using thermal print head.

Another object is to produce images at lower heat levels by focusing heat into the dye laser.

Another object is to eliminate the need for thin webs. These objects are achieved in an ultrasonic thermal printing system in which heat is applied to dye in a carrier to cause the dye to sublime and transfer to a receiver, wherein the improvement comprises ultrasonic transmissions means including lens means for selectively transmitting focused ultrasonic energy to selected pixels in the doner, such transmitted energy being sufficient to cause dye in the selected pixel to transfer to the receiver.

Features and advantages of the invention include: (1) dye transfer by focused ultrasonic action produces very little wasted heat, so there are less problems of thermal distortion and (2) there is improved resolution which is governed by the speed of sound (c) in the material and the frequency (f) of sound which results in a focused resolution; the limit of that resolution is approximately c/f. The use of focused ultrasonic energy eliminates the need for thin webs.

DESCRIPTION OF THE PREFERRED EMBODIMENT

Figure 1:
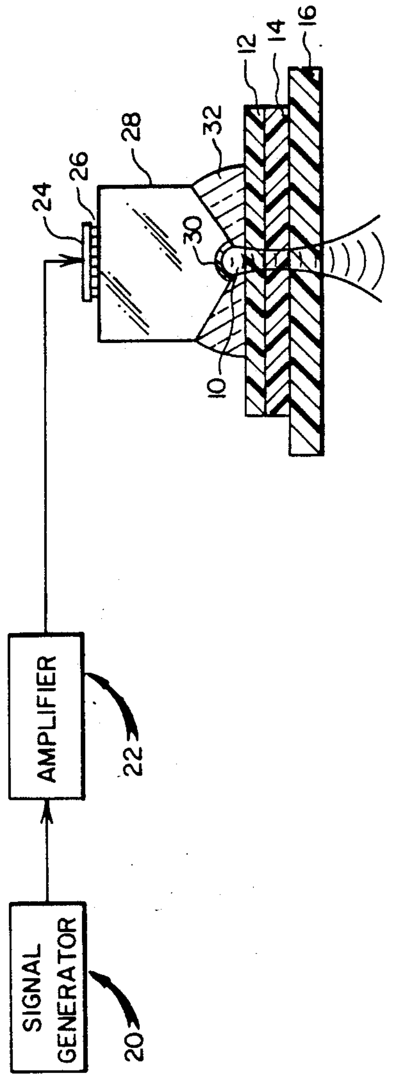
FIG. 1 is a block diagram which illustrates an ultrasonic pixel printer in accordance with the invention.

FIG. 1 shows a pixel printer with an ultrasonic beam 10, focused through a dye support layer 12 and into a dye layer 14 mounted on the layer 12. The layers 12 and 14 are often referred to a donor. After ultrasonic action which produces heat, dye contained in the dye layer 14 is transferred to a dye receiver 16.

The ultrasonic beam is produced via a signal generator 20, which provides a signal between 1 to 500 MHz and is amplified by a broadband power amplifier 22, and sent to a transducer 24. The frequency range of 1 to 500 MHz results in optimal pixel resolution for photographic image formation. An adhesion layer 26 bonds the transducer 24 to an ultrasonic lens 28, which focuses the ultrasonic beam 10 into the dye donor layer 14. Lens materials which can be used are quartz, fused silica, sapphire, flint or crown glass, aluminum, brass, steel and plastics such as polyethylene or polymethylmethacrylate. In selecting the adhesion layer 26, it is advantageous, as is well known in the art, to have one whose acoustic impedance, the product of the velocity of sound in the material and its density, is between that of the transducer and the lens so as to maximize the acoustic transmission from the transducer to the lens. It is also important that acoustic absorption in the frequency range of interest be minimized. The other acoustic materials for transmission and/or ultrasonic energy controlling elements can also be selected using these well-known acoustic criteria.

Preferably, a quarterwave acoustic impedance matching layer 30 is used to improve the match of acoustic impedance between the lens 28 and an acoustic coupling fluid 32. A separate lens is needed for each image pixel if such pixels are simultaneously formed. The purpose of the impedance coupling or matching fluid 32 is to increase the transmission of the ultrasonic energy through the lens 28, and into the donor comprised of the support layer 12 and the dye donor layer 14. While it is preferable to focus the ultrasonic beam 10 into the dye donor layer 14 in order to localize and contain the heating, dye can be transferred for ultrasonic energy focused into the impedance matching fluid 32, the dye support layer 12, or the dye receiver 16.

Upon application of high frequency electrical energy to the transducer 24, dye is transferred to the receiver 16. Image pixel resolution in the receiver 16 is determined principally by the frequency and the selection of the lens material and influenced by selection of other materials in the acoustic beam bath.

The present invention is suitable for use in wax transfer systems in which dye is contained in a wx matrix. When the wax is heated, it melts and an image pixel is transferred to the receiver. however, sublimable dyes are preferable.

Any sublimable dye can be used in the dye layer 14 provided it is transferable to the dye image-receiving layer of the dye-receiving element of the invention by the action of heat. Especially good results have been obtained with sublimable dyes. Examples of sublimable dyes include anthraquinone dyes, e.g., Sumikalon Violet RS® (product of Sumitomo Chemical Co., Ltd.), Dianix Fast Violet 3R-FS® (product of Mitsubishi Chemical Industries, Ltd.), and Kayalon Polyol Brilliant Blue N-BGM® and KST Black 146® (products of Nippon Kayaku Co., Ltd.), azo dyes such as Kayalon Polyol Brilliant Blue BM®, Kayalon Polyol Dark Blue 2BM®, and KST Black KR®, (products of Nippon Kayaku Co., Ltd.), Sumickaron Diazo Black 5G® (product of Sumitomo Chemical Co., Ltd.), and Miktazol Black 5GH® (product of Mitsui Toatsu Chemicals., Inc.); direct dyes such as Direct Dark Green B® (product of Mitsubishi Chemical Industries, Ltd.) and Direct Brown M® and Direct Fast Black D® (products of Nippon Kayaku Co., Ltd.); acid dyes such as kayanol Milling Cyanine 5R® (product of Nippon Kayaku Co., Ltd.); basic dyes such as Sumicacryl Blue 6G® (product of Sumitomo Chemical Co., Ltd.), and Aizen Malachite Green® (product of Hodogaya Chemical Co., Ltd.); or any of the dyes disclosed in U.S. Pat. No. 4,541,830, the disclosure of which is hereby incorporated by reference. The above dyes may be employed singly or in combination to obtain a monochrome. The dyes may be used at a coverage of from about 0.05 to about 1 $g/m^2$ and are preferably hydrophobic.

The dye support layer 12 can consist of any continuous nonfiborous polymeric material such as polyethylene, polycarbonate or polyester.

EXAMPLE

A Hewlett-Packard FG502 11 Mhz Function Generator set at a nominal 5 Mhz was used as the signal generator 20, and the amplifier 22 was an Interaction Corporation Model PA-4 RF Power Amplifier. The piezoelectric transducer 24 was a Valpey Fisher Lead Metaniobate transducer with a 5 Mhz resonance frequency. The adhesive 25 was LOCTITE Super Binder 495 and the impedance coupling fluid 32 was distilled water. The lens 28 was a 12 mm thick plano concave flint glass lens with a radius of curvature of 2.5 mm without the preferred quarterwave plate 30. A sublimable image was transferred into the receiver 16 to form dye image pixels.

For example, improvements can be realized by matching the impedance and frequency ranges of the electronic components with each other and through an impedance matching circuit with the transducer. Those stated in the art will recognize that the selection of materials for production of ultrasonic energy, its control and focusing can be optimized so as to maximize impedance matching and to minimize ultrasonic absorption at a particular frequency. For example, using a lens made from a plastic material whose ultrasonic impedance in certain instances can more closely match that of the adhesive and coupling fluid. Material selection for the elements would include the transducer, adhesives, lens, quarterwave plate (or using two), coupling fluid, dye support layer, and materials within the dye layer, as well as the thicknesses of the dye support and dye layers.

The invention has been described in detail with particular reference to preferred embodiments thereof, but it will be understood that variations and modifications can be effected within the spirit and scope of the invention.

We claim:

1. In an ultrasonic thermal printing system in which ultrasonic energy is applied to dye in a dye carrier to cause the dye to sublime and transfer to a receiver, the improvement comprising:

ultrasonic transmission means for selectively transmitting ultrasonic energy in a frequency range of from about 1 to 500 MHz for a selected pixels in the dye carrier, such transmitted energy being sufficient to cause dye in a selected pixel to sublime and/or melt and transfer to a receiver; and lens means including a lens for receiving ultrasonic energy from said ultrasonic transmission means for focusing such energy into the dye carrier to cause dye to sublime and transfer into the receiver.

2. The invention as set for the in claim 1, wherein said lens means is selected from the group consisting of quartz, fused silica, sapphire, flint or crown glass, aluminum, brass, steel and plastics such as polyethylene or polymethylmethacrylate.

3. An ultrasonic thermal printing system in which ultrasonic energy passes through the support and into the dye layer of a donor to sublime dye and transfer it to a receiver, comprising:

(a) a transducer for producing ultrasonic energy;

(b) ultrasonic transmission means including acoustical impedance matching fluid for selectively transmitting ultrasonic energy in a frequency range of from about 1 to 500 MHz for selected pixels in the donor, such transmitted energy being sufficient to cause dye in a selected pixel to sublime and transfer to a receiver; and (c) lens means including a lens for each carrier pixel for receiving ultrasonic energy from said ultrasonic transmission means for focusing such energy into the donor to cause dye to sublime and transfer to the receiver.

* * * * *